United States Patent
Garcia et al.

(10) Patent No.: US 12,010,944 B2
(45) Date of Patent: Jun. 18, 2024

(54) MOWER DECK TRANSPORT LOCK

(71) Applicant: Deere & Company, Moline, IL (US)

(72) Inventors: Jorge Cavazos Garcia, Monterrey (MX); Maxwell G Anderson, Hartford, WI (US); Sebastian Baena, Monterrey (MX); Wesley E Clontz, Willow Spring, NC (US)

(73) Assignee: DEERE & COMPANY, Moline, IL (US)

( * ) Notice: Subject to any disclaimer, the term of this patent is extended or adjusted under 35 U.S.C. 154(b) by 505 days.

(21) Appl. No.: 16/948,477

(22) Filed: Sep. 21, 2020

(65) Prior Publication Data

US 2022/0087100 A1 Mar. 24, 2022

(51) Int. Cl.
*A01D 34/74* (2006.01)
*A01D 34/82* (2006.01)

(52) U.S. Cl.
CPC ............. *A01D 34/82* (2013.01); *A01D 34/74* (2013.01)

(58) Field of Classification Search
CPC .................................. A01D 34/74; A01D 34/82
See application file for complete search history.

(56) References Cited

U.S. PATENT DOCUMENTS

| | | | |
|---|---|---|---|
| 5,784,870 A * | 7/1998 | Seegert ................... | F16H 15/02 56/320.1 |
| 5,816,033 A | 10/1998 | Busboom et al. | |
| 6,494,028 B2 | 12/2002 | Moore | |
| 6,837,032 B1 * | 1/2005 | Swartzendruber ..... | A01D 34/64 56/14.9 |
| 6,868,658 B2 | 3/2005 | Velke et al. | |
| 7,003,937 B1 | 2/2006 | Tarver | |
| 7,448,191 B2 | 11/2008 | Elhardt et al. | |
| 7,540,134 B1 * | 6/2009 | Reich ..................... | A01D 34/74 56/14.9 |
| 7,578,117 B2 | 8/2009 | Shaffer et al. | |
| 7,614,207 B2 | 11/2009 | Elhardt et al. | |
| 7,712,294 B2 | 5/2010 | Wright et al. | |
| 8,919,087 B2 * | 12/2014 | Lancaster .............. | A01D 34/74 56/15.8 |
| 9,288,940 B2 | 3/2016 | Berglund | |
| 11,006,574 B1 * | 5/2021 | Nichols .................. | A01D 34/74 |
| 2002/0088217 A1 * | 7/2002 | Dennis .................. | A01D 34/662 56/15.8 |
| 2007/0062170 A1 | 3/2007 | Finkner | |
| 2008/0229725 A1 * | 9/2008 | Shaffer .................. | A01D 34/74 56/17.1 |
| 2009/0031687 A1 * | 2/2009 | Elhardt .................. | A01D 34/74 56/17.1 |
| 2014/0331630 A1 * | 11/2014 | Phillips ................. | B60T 8/1755 56/10.2 H |
| 2018/0037183 A1 * | 2/2018 | Bartel ................... | A01D 34/824 |
| 2019/0373798 A1 * | 12/2019 | Walsh .................... | A01D 75/00 |
| 2019/0387676 A1 | 12/2019 | Welz et al. | |

* cited by examiner

*Primary Examiner* — Thomas B Will
*Assistant Examiner* — Julia C Tran

(57) ABSTRACT

A mower deck transport lock for a parallelogram lift linkage supporting a mower deck at any of a plurality of cutting heights where a striker plate contacts a height of cut selection knob. A transport bracket pivots into engagement with the striker plate only at a transport height above the plurality of cutting heights. A transport lock indicator is activated when the transport bracket pivots into engagement with the striker plate.

13 Claims, 3 Drawing Sheets

MOWER DECK TRANSPORT LOCK

FIELD OF THE INVENTION

This invention relates generally to height adjustable mower cutting decks, and specifically to a mower deck transport lock having an indicator showing if the mower deck is at a transport height.

BACKGROUND OF THE INVENTION

Vegetation cutting implements such as mower cutting decks are typically carried by self-propelled vehicles such as zero turning radius mowers and lawn tractors having mechanisms allowing adjustment of the decks between a range of heights above ground level. Ordinarily, the range extends between a position at or below the lowest available cut height to a position at or above the highest available cut height. Adjustment to a position below the cut height range is frequently preferred for ease in removal of the deck from the vehicle because the deck is that much closer to the ground surface. Adjustment above the cut height range may permit the deck to clear obstacles encountered while traveling across the ground. This maximum height position may be referred to as the mower deck transport height.

Height of cut mechanisms on zero turning radius mowers or lawn tractors may include a pin or knob inserted into one of several openings or holes in a height of cut plate or bracket. The operator may raise the mower deck with a foot pedal or lever, insert the pin, then lower the mower deck down to the selected cut height set by the pin. A striker plate may contact the pin at the selected cut height. The deck also may be raised to the transport position above the maximum cut height. When the deck is raised to the transport position, the pin may remain in place, so the mower deck may be lowered from the transport position back down to the previous cut height. However, operators might forget to lower the mower deck from the transport position back to the cut height, resulting in unproductive time mowing above the selected cut height.

A mower deck transport lock is needed having an indicator showing if the mower deck is in the transport position. A mower deck transport lock with an indicator is needed for use with height of cut mechanisms having a striker plate and a pin or knob inserted into a height of cut plate or bracket. A mower deck transport lock is needed that is low cost, light weight and requires minimal assembly time.

SUMMARY OF THE INVENTION

A mower deck transport lock with a striker plate sliding into a height of cut selection bracket and supporting a mower deck at a plurality of different height of cut positions corresponding to the position of the striker plate. A transport bracket rides on the striker plate and pivots into engagement with the striker plate when the striker plate is at a transport position above the plurality of different height of cut positions. A transport lock indicator is connected to the transport bracket and extends out through a body panel when the transport bracket pivots into engagement with the striker plate.

DESCRIPTION OF THE PREFERRED EMBODIMENT

Figure 1:
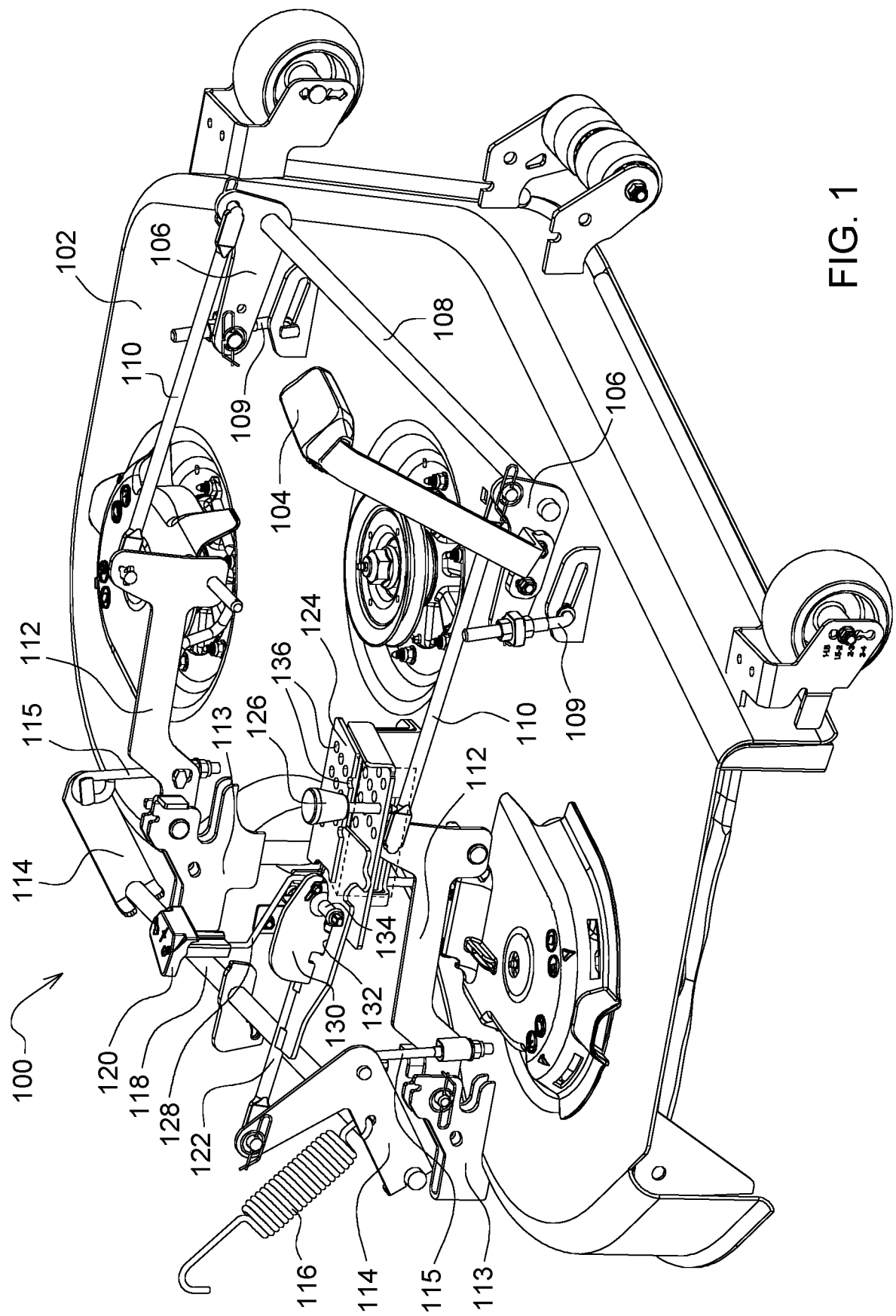
FIG. 1 is a perspective view of a mower deck transport lock with an indicator according to a first embodiment of the invention.
Figure 2:
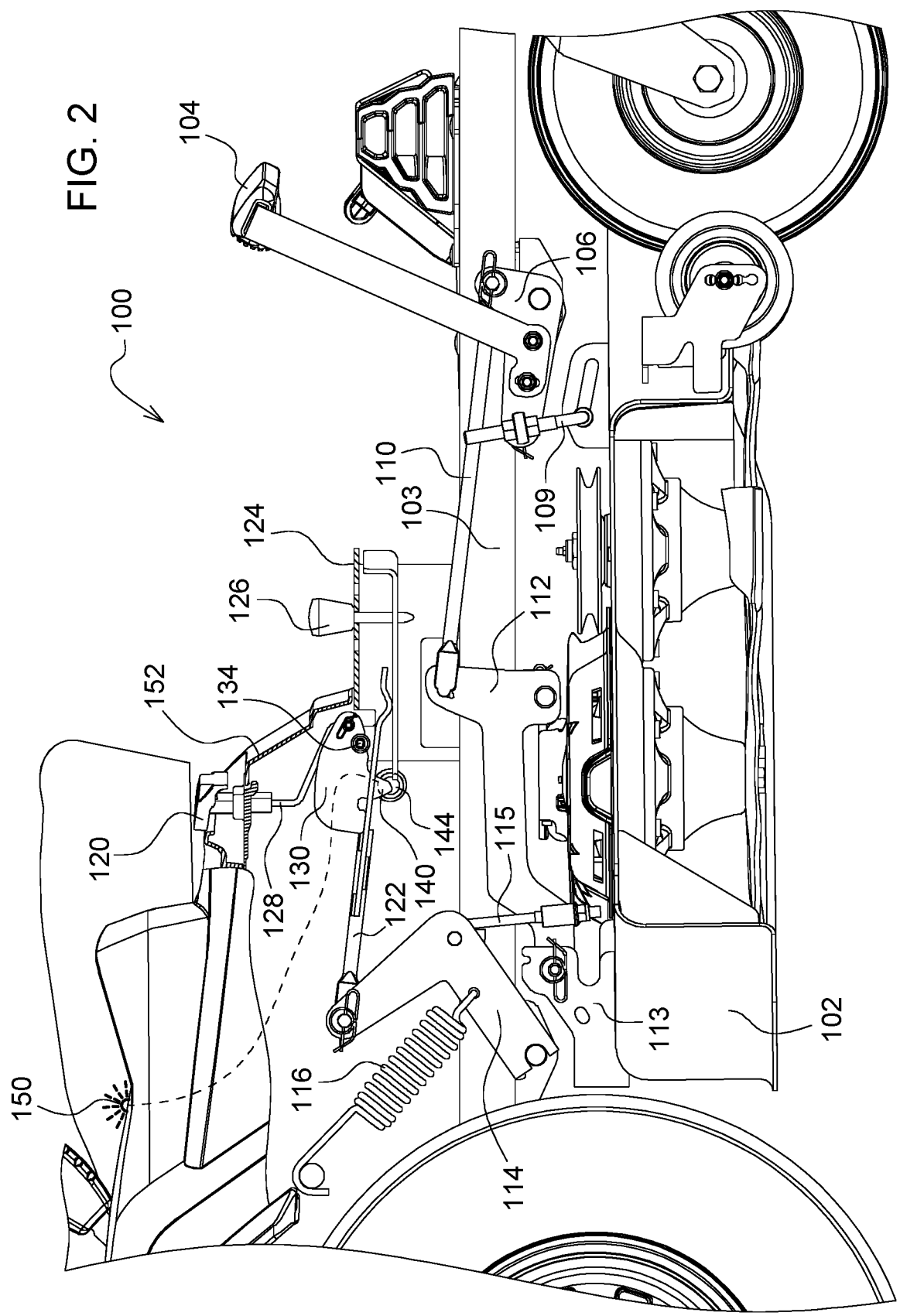
FIG. 2 is a side view of a mower deck transport lock with an indicator showing the transport lock is activated according to a first embodiment of the invention.
Figure 3:
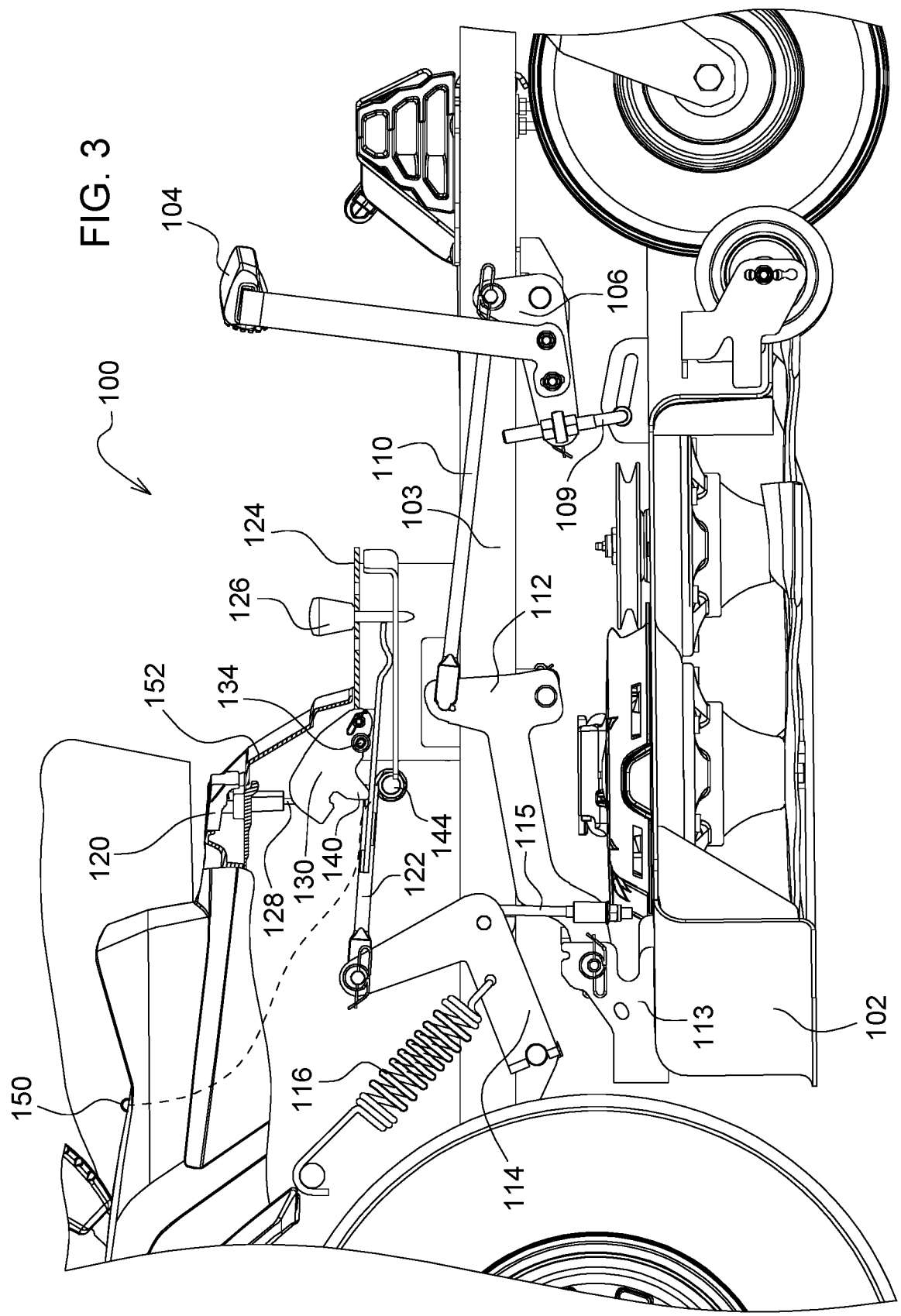
FIG. 3 is a side view of a mower deck transport lock with an indicator showing the transport lock is deactivated according to a first embodiment of the invention.

In one embodiment shown in FIGS. 1-3, mower deck transport lock 100 may be on mower deck 102 under the frame of a self-propelled vehicle such as a lawn tractor or zero turning radius mower. The frame may include a pair of longitudinal frame members 103. The mower deck may cover at least 2 or 3 rotary mower blades and may include a side or rear discharge chute for collection of grass clippings.

In one embodiment, mower deck transport lock 100 may be used with a height of cut system having a parallelogram linkage to adjust the vertical position of the mower deck relative to the frame and the ground. For example, foot pedal 104 may be depressed to raise the mower deck, and to lower the mower deck to the selected cut height. Depressing the foot pedal may pivot a pair of front rockshaft arms 106 which support the front of the mower deck. Front hangers 109 may suspend the front end of the mower deck from the front rockshaft arms. The front rockshaft arms may be L-shaped and may be pivotably mounted to longitudinal frame members 103 and connected to each other by front rockshaft 108.

In one embodiment, mower deck transport lock 100 may include linkage rods 110 connecting each front rockshaft arm 106 to a rear draft arm 112. The first or forward end of each rear draft arm 112 may be pivotably mounted to frame member 103, and the second or rearward end may be pivotably mounted to bracket 113 on the rear of the mower deck. Additionally, rear hanger 115 may suspend the rearward end of each rear draft arm 112 from one of rear rockshaft arms 114. Each rear rockshaft arm 114 may be L-shaped and pivotably mounted to frame member 103 rearwardly of each rear draft arm 112. The rear rockshaft arms may be connected to each other by rear rockshaft 118, and coil spring 116 connecting one of rear rockshaft arms to the frame may assist raising the mower deck.

In one embodiment, mower deck transport lock 100 may include a height of cut system that includes a knob or pin 126 the operator may insert into one of multiple holes or slots 136 in height of cut selection bracket 124. Each hole or slot may provide a different cut height for the mower deck. The knob or pin stops striker plate 122 as it slides into height of cut selection bracket 124. The striker plate may be attached to one of rear rockshaft arms 114, and support the rear rockshaft arm and parallelogram linkage at an alignment for the selected cut height.

In one embodiment, mower deck transport lock 100 may include transport lock indicator 120 showing if the transport lock is activated. The transport lock may be activated by depressing foot pedal 104 to raise the mower deck to the maximum height or transport position. Depressing the foot pedal causes striker plate 122 to slide further out from height of cut selection bracket 124. As the striker plate slides further out, transport bracket 130 rides on the top surface of the striker plate. Transport bracket 130 may ride on the striker plate until the transport bracket engages the striker plate at the maximum height position. Transport bracket 130 may engage the striker plate when projection or tip 140 near the first end of the transport bracket enters slot or recess 132 in striker plate 122, and the transport bracket pivots on the axis of rod 134 to the activated position.

In one embodiment, mower deck transport lock 100 may include transport lock indicator 120 showing if the transport lock is activated. Additionally, the transport lock indicator may be used to deactivate the transport lock. The transport lock indicator may be located adjacent the operator seat or operator station of a zero turning radius mower or lawn tractor. For example, the transport lock indicator may be a button or handle connected by wire form 128 to transport bracket 130. The transport lock indicator may extend out and up through the surface of body panel 152. To release or deactivate the transport lock, the operator may depress the foot pedal to raise the mower deck, depress the transport lock indicator to a position that is flush or slightly below with the body panel surface, then release the foot pedal to return the mower deck to the previous cut height. The knob or pin used to set the cut height may stay in place so the mower deck may return to the previous cut height after lowering the mower deck from the transport position.

Optionally, the mower deck transport lock also may include electrically activated transport lock indicator 150. For example, the electrically activated transport lock indicator may have an LED or warning light on the dashboard or operator station adjacent the operator seat. The electrically activated transport lock indicator may be activated when sensor 144 detects the projection or tip 140 of transport bracket enters slot or recess 132 in striker plate 122. The electrically activated transport lock may remain activated until the transport bracket pivots out of the slot or recess because the mower deck is moved to a cut height below the transport position.

Having described the preferred embodiments, it will become apparent that various modifications can be made without departing from the scope of the invention as defined in the accompanying claims.

What is claimed is:

1. A mower deck transport lock, comprising:
    a striker plate sliding into a height of cut selection bracket and supporting a mower deck at a plurality of different height of cut positions corresponding to the position of the striker plate;
    a transport bracket riding on the striker plate in sliding engagement with a surface of the striker plate as the striker plate slides away from the height of cut selection bracket, the transport bracket pivoting automatically into locking engagement with the striker plate when the striker plate reaches a transport position above the plurality of different height of cut positions to hold the mower deck at the transport position; and
    a transport lock indicator connected to the transport bracket and automatically extending out through a body panel as the transport bracket pivots into the locking engagement with the striker plate.

2. The mower deck transport lock of claim 1 further comprising a wire form connecting the transport bracket to the transport lock indicator.

3. The mower deck transport lock of claim 1 wherein the surface of the striker plate includes a planar face, further comprising a slot in the planar face of the striker plate through which the transport bracket passes to define the locking engagement when the striker plate is in the transport position.

4. The mower deck transport lock of claim 1 further comprising a pin insertable into any of a plurality of holes in the height of cut selection bracket for the plurality of different height of cut positions.

5. The mower deck transport lock of claim 1 wherein the transport lock indicator is manually moveable to disengage the transport bracket from the striker plate.

6. A mower deck transport lock, comprising:
    a transport bracket movable into locking engagement with a striker plate to hold a mower deck at a transport position, wherein the transport bracket is slidable in engagement with a surface of the striker plate as the striker plate moves towards the transport position; and
    a transport lock indicator adjacent an operator seat that is activated automatically without manual contact by raising the mower deck to the transport position, and deactivated by using a foot pedal to raise the mower deck and pushing in the transport lock indicator to move the transport bracket to disengage from locking engagement with the striker plate while remaining in sliding engagement with the striker plate.

7. The mower deck transport lock of claim 6 further comprising an electrical sensor that senses if the transport bracket is in locking engagement with the striker plate.

8. The mower deck transport lock of claim 6 further comprising an electrically activated transport lock indicator light.

9. A mower deck transport lock, comprising:
    a parallelogram lift linkage supporting a mower deck at any of a plurality of cutting heights where a striker plate contacts a height of cut selection knob;
    a transport bracket pivoting into locking engagement with the striker plate at a transport height above the plurality of cutting heights, wherein the transport bracket is slidable in engagement with a surface of the striker plate as the striker plate moves towards the transport position; and
    a transport lock indicator activated automatically without manually contacting the transport lock indicator by pivoting the transport bracket into engagement with the striker plate.

10. The mower deck transport lock of claim 9 wherein the surface of the striker plate includes a planar face, wherein a projection on the transport bracket movable with the transport bracket enters a slot in the planar face of the striker plate as the transport bracket pivots into the locking engagement with the striker plate.

11. The mower deck transport lock of claim 9 wherein a sensor detects the transport bracket pivoting into engagement with the striker plate, and the sensor activates an electrically activated transport lock indicator.

12. The mower deck transport lock of claim 9 wherein the mower deck may be raised and the transport lock indicator may be depressed to disengage the transport bracket from the striker plate.

13. The mower deck transport lock of claim 6 wherein the surface of the striker plate includes a planar face, further comprising a slot in the planar surface of the striker plate through which the transport bracket passes to define the locking engagement.

\* \* \* \* \*